US011313711B2

(12) United States Patent
Hoferer

(10) Patent No.: US 11,313,711 B2
(45) Date of Patent: Apr. 26, 2022

(54) FIELD DEVICE HAVING A PLURALITY OF ARITHMETIC UNITS

(71) Applicant: VEGA Grieshaber KG, Wolfach (DE)

(72) Inventor: Christian Hoferer, Offenburg (DE)

(73) Assignee: VEGA Grieshaber KG, Wolfach (DE)

( * ) Notice: Subject to any disclaimer, the term of this patent is extended or adjusted under 35 U.S.C. 154(b) by 0 days.

(21) Appl. No.: 17/260,747

(22) PCT Filed: Jul. 4, 2019

(86) PCT No.: PCT/EP2019/067969
§ 371 (c)(1),
(2) Date: Jan. 15, 2021

(87) PCT Pub. No.: WO2020/016022
PCT Pub. Date: Jan. 23, 2020

(65) Prior Publication Data
US 2021/0262848 A1 Aug. 26, 2021

(30) Foreign Application Priority Data

Jul. 19, 2018 (DE) ...................... 10 2018 212 097.8

(51) Int. Cl.
*G01F 23/284* (2006.01)
(52) U.S. Cl.
CPC .................................. *G01F 23/284* (2013.01)
(58) Field of Classification Search
CPC .................................................... G01F 23/284
See application file for complete search history.

(56) References Cited

U.S. PATENT DOCUMENTS 3,333,118 A 7/1967 Cote, Jr.
6,930,609 B1 8/2005 Florenz et al.
(Continued)

FOREIGN PATENT DOCUMENTS

DE 42 23 346 A1 1/1994
DE 4223346 A1 * 1/1994 ......... G01F 23/2962
(Continued)

OTHER PUBLICATIONS

Herbert et al., "A Real Time PMU Data and Neural Network Approach to Analyze Voltage Stability", 2011The International Conference on Advanced Power System Automation and Protection (Year: 2011).*
(Continued)

*Primary Examiner* — Regis J Betsch
(74) *Attorney, Agent, or Firm* — Oblon, McClelland, Maier & Neustadt, L.L.P.

(57) ABSTRACT

A field device is provided for detecting a process measurement variable, which is configured as a level measuring device for detecting a fill level of a medium, the field device including: a sensor arrangement to detect a measurement signal correlating with the process measurement variable; and a computing arrangement to determine a measurement value of the process measurement variable based on the measurement signal, the computing arrangement including at least one first computing device and at least one second computing device, the first computing device being configured to perform at least one deterministic computing operation, and the second computing device including at least one artificial intelligence module, and being configured to perform at least one probability-based and/or classification-based computing operation. A method of operating the field device is also provided.

15 Claims, 2 Drawing Sheets

(56) References Cited

U.S. PATENT DOCUMENTS

| | | | |
|---|---|---|---|
| 8,819,656 B2 * | 8/2014 | Budmiger | G05B 19/0426 |
| | | | 717/168 |
| 2005/0278520 A1 * | 12/2005 | Hirai | G06F 1/206 |
| | | | 713/1 |
| 2006/0052954 A1 | 3/2006 | Welle et al. | |
| 2008/0154522 A1 | 6/2008 | Welle et al. | |
| 2008/0288933 A1 | 11/2008 | Budmiger et al. | |
| 2011/0145180 A1 | 6/2011 | Muller | |

FOREIGN PATENT DOCUMENTS

| | | | | |
|---|---|---|---|---|
| DE | 42 23 346 C2 | 5/1996 | | |
| DE | 198 24 267 A1 | 12/1999 | | |
| DE | 199 54 186 A1 | 5/2001 | | |
| DE | 10 2008 036 968 A1 | 2/2010 | | |
| EP | 1 628 119 A2 | 2/2006 | | |
| EP | 1628119 A2 * | 2/2006 | | G01S 13/88 |
| WO | WO-9324872 A1 * | 12/1993 | | G05B 23/0232 |

OTHER PUBLICATIONS

International Preliminary Report on Patentability and Written Opinion dated Jan. 28, 2021 in PCT/EP2019/067969 (submitting English translation only), 7 pages.

International Search Report dated Oct. 24, 2019 in PCT/EP2019/067969 filed on Jul. 4, 2019, 3 pages.

* cited by examiner

FIELD DEVICE HAVING A PLURALITY OF ARITHMETIC UNITS

REFERENCE TO RELATED APPLICATIONS

The present application claims priority of German Patent Application No. 10 2018 212 097.8, filed Jul. 19, 2018, which is incorporated herein by reference in its entirety.

FIELD OF INVENTION

The invention relates generally to the field of process automation. In particular, the invention relates to a field device for detecting a process measurement variable, for example a fill level meter and/or a radar-based fill level meter for detecting a fill level of a medium. Furthermore, the invention relates to a method for operating such a field device.

INVENTION BACKGROUND

In industrial measurement technology, especially in the field of process automation and process control, field devices are regularly used to record one or more process measurement variables or process measurement variables. Field devices include in particular flow meters, flow velocity meters, pressure meters, differential pressure meters, temperature meters and level meters. By means of a corresponding sensor or sensor arrangement, the field devices usually record a measurement signal that correlates with one or more process measurement variables. Via a computer unit, a control unit and/or an evaluation unit of the respective field device, a measurement value for the respective process measurement variable can then be determined based on the measurement signal and/or based on an evaluation of the measurement signal.

Field devices that perform these operations using an artificial neural network have also been proposed for carrying out computing operations that occur during the operation of a field device, for example computing operations during the actual determination of the measured values or computing operations during a diagnostic procedure. However, due to the high complexity and the associated high computing and energy requirements, the use of an artificial neural network in field devices has not yet been technically feasible.

SUMMARY OF THE INVENTION

The present invention can provide an improved field device for determining a process measurement variable.

The invention is defined in the independent patent claims. Advantageous further embodiments and/or examples are recited in the dependent patent claims and described in the following description.

One aspect of the invention relates to a field device for determining a process measurement variable and/or a process measurand. The field device comprises a sensor arrangement for detecting a measurement signal correlating with the process measurement variable. The measurement signal can be an analog or a digital measurement signal. Furthermore, the field device has a computing arrangement for determining a measurement value of the process measurement variable based on the measurement signal, based on an evaluation of the measurement signal and/or based on a processing of the measurement signal. In this case, the computing arrangement has at least one first computing device and at least one second computing device, the first computing device being computing device to carry out at least one deterministic computing operation. The second computing device further comprises at least one artificial intelligence module (hereinafter also referred to as "AI module") and is configured to perform at least one probability-based and/or classification-based computing operation. The at least one probability-based and/or classification-based computing operation may be different from the at least one deterministic computing operation.

In general, the first computing device may denote a regular arithmetic unit. For example, the first computing device may comprise a microcontroller, an x86 architecture, a Von Neumann architecture, a Harvard architecture, and/or a hybrid of Von Neumann architecture and Harvard architecture. The at least one AI module of the second computing device may comprise an artificial neural network, in particular a multilayer artificial neural network, a neuromorphic processor, a neurosynaptic processor, and/or a neuristor-based processor.

By using the first and second computing device, a set of computing operations which are to be performed by the arithmetic arrangement, for example, in the course of determining the measured value, in the course of a diagnosis, in the course of performing a diagnostic procedure and/or in the course of operating the field device can be distributed to the first and second computing device in an advantageous manner. In other words, tasks and/or operating procedures which are to be performed by the field device can be distributed in an advantageous manner to the first and the second computing device. In this way, in particular, a performance and/or an energy consumption of the field device can be optimized and/or improved, for example in comparison with a field device which has only one AI module or only one regular computing device. Overall, the operation of the field device can thus be made more efficient. At the same time, an improved field device can be provided.

In general, the field device can be configured as a level measuring device, in particular as a radar-based level measuring device, for detecting a fill level of a medium, as a flow measuring device for detecting a flow of a medium, as a flow velocity measuring device for detecting a flow velocity of a medium, as a pressure measuring device for detecting a pressure or differential pressure and/or as a temperature measuring device for detecting a temperature. Also, the field device may be any other field device.

The sensor arrangement may have a sensor circuit for detecting a measurement signal correlating with the process measurement variable and/or may designate a sensor circuit. In this regard, the sensor arrangement may have one or more sensors, for example, a level sensor, a radar-based level sensor, a flow sensor, a flow velocity sensor, and/or a temperature sensor.

If the field device is configured as a level meter, the sensor arrangement may, for example, comprise a radar module with at least one frequency generator, such as an oscillator and/or a voltage-controlled oscillator, one or more amplifiers, one or more frequency mixers and/or one or more antennas. For example, the sensor arrangement may generate a radar-based transmitted signal, such as having a frequency between 1 GHz and 200 GHz, which may be radiated in the direction of the medium via the at least one antenna. A part of the transmitted signal reflected at a surface of the medium can then be received as a received signal via the at least one antenna. The received signal can thereby designate the measurement signal. Also, the received signal can be converted into an intermediate frequency signal by means of at least one frequency mixer, which can optionally also be amplified and/or converted into a digital signal by means of an analog-to-digital converter. The digital signal can also constitute, represent and/or designate the measurement signal.

The first and second computing devices may denote separate, distinct, independent and/or separate arithmetic units. The first and second computing devices may cooperate in a coordinated and/or mutually harmonized manner. For this purpose, the first and second computing devices may be in communication exchange and/or in data exchange with each other, for example, via a communication link, a data link, a bus interface, and/or a bus system. The first and the second computing device can exchange data and/or signals simplex, duplex, full duplex, serial or parallel. A data or signal exchange may be encrypted and/or provided with a checksum. Each of the first and second computing devices may have a separate data memory and/or separate memory area. Alternatively, the first and the second computing device may have a common data memory and/or a common memory area.

As explained above, the first computing device can be a computing device to perform a deterministic computing operation. Similarly, the first computing device may be configured as a deterministic arithmetic unit. The term "deterministic" can mean here and in the following that the first computing device is configured to execute a deterministic algorithm in which well-defined and/or reproducible states occur and/or in which a certain input always leads to the same output while passing through the same states.

The second computing device with the at least one AI module, on the other hand, may be configured to perform a non-deterministic, probability-based and/or classification-based computing operation. The non-deterministic, probability-based and/or classification-based computing operation may, for example, denote a computing operation whose result may be an output of one or more probabilities or probability values for one or more classes of events and/or outcomes. Alternatively or additionally, the output may be one or more classes and/or class labels. The second computing operation and/or the AI module may thus comprise a classifier and/or be configured as a classifier.

According to an embodiment of the invention, the field device further comprises a selector which is configured to assign and/or allocate a computing operation to be performed by the arithmetic arrangement, such as a computing operation currently to be performed by the arithmetic arrangement, to either the first computing device or the second computing device. For example, the selector may be part of the computing arrangement. In particular, the selector may be at least partially implemented in the first computing device and/or the second computing device. Also, the selector may be implemented at least partially in a further arithmetic unit. The selector may, for example, designate an operation switch and/or be computing device to process and/or analyze the computing operation currently to be performed by the arithmetic arrangement and to transmit the computing operation to either the first computing device or the second computing device based on predefined and/or definable criteria. At the same time, the selector can cause the first and/or second computing device to execute the computing operation currently to be performed.

According to an embodiment of the invention, the selector is configured to determine an energy consumption for performing the computing operation, such as the computing operation currently to be performed by the arithmetic arrangement, by the first computing device and/or by the second computing device. Alternatively or additionally, the selector is configured to allocate the computing operation to be (currently) performed by the arithmetic arrangement to the one of the first computing device and the second computing device for which the energy consumption for performing the computing operation is lower compared to a performance on the other of the first and second computing devices. In other words, by means of the selector, the first computing device can execute computing operations, algorithms and/or program parts whose execution on the second computing device would be more energy-intensive, and vice versa. In this way, the overall energy consumption of the field device can be reduced and/or the field device can be operated in an energy-saving manner. This can be particularly advantageous for two-wire field devices and/or battery-powered field devices.

An energy consumption for one or more computing operations, in particular one or more deterministic and/or probability-based (or classification-based) computing operations, may be determined, for example, experimentally, by calibration and/or simulation. For example, one or more energy consumption values for one or more computing operations may be stored in a data memory of the field device. Also, a marker and/or flag for one or more computing operations may be stored in the data memory. The marker can indicate, for example, which of the first and second computing devices can perform the respective computing operation with lower energy consumption and/or to which of the arithmetic units the respective computing operation is to be assigned. During operation of the field device, the selector for the computing operation currently to be performed can determine the corresponding arithmetic unit for performing the computing operation based on the marker or flag and/or based on the at least one energy consumption value. The at least one marker and/or the at least one energy consumption value can be stored, for example, in a look-up table in the data memory.

According to an embodiment of the invention, the field device has at least one energy storage device which is configured to supply the first computing device and/or the second computing device with electrical energy at least temporarily. The first and the second computing device can be supplied with electrical energy from a common energy storage device. Alternatively, only one of the arithmetic units can be supplied via an energy storage unit, or both arithmetic units can each be supplied via their own separate and/or distinct energy storage units. In this way, an at least temporarily increased energy requirement of the first and/or second computing device can be covered. The energy storage device can take the form of a capacitor, a battery, an accumulator and/or any other type of energy storage device.

According to an embodiment of the invention, the field device is configured as a two-wire field device, in particular as a 4-20 mA field device. The field device can have a current control stage with which the measurement value can be converted into a current signal which can then be transmitted via a power supply line of the field device, for example to a control station.

According to an embodiment of the invention, the at least one deterministic computing operation is associated with at least one operation selected from the group consisting of analog-to-digital conversion, scaling to determine the measurement value based on the measurement signal, unit conversion to determine the measurement value based on the measurement signal, monitoring a functionality of the field device, and computing the measured value.

According to an embodiment of the invention, the at least one probability-based and/or classification-based computational operation is associated with at least one operational operation selected from the group consisting of detecting an aging of at least a portion of the field device, detecting a drift of the sensor arrangement, detecting a contamination of at least a portion of the sensor arrangement, detecting a signal quality of the measurement signal, detecting a signal strength of the measurement signal, detecting and/or determining at least one interference influence on the measurement signal, and detecting an electromagnetic interference of at least a portion of the field device.

According to an embodiment of the invention, the second computing device is configured to adjust a value of at least one evaluation parameter and/or to perform a parameterization of the field device (and/or of the first computing device), wherein the first computing device is configured to determine the measurement value based on the at least one adjusted evaluation parameter and based on the at least one deterministic computing operation. For example, the first computing device may be configured to determine aging of a component, such as at least a portion of the sensor arrangement, of the field device. Such aging may, for example, result in a reduced signal quality and/or signal strength of the measurement signal. The second computing device, while performing one or more probability-based (or classification-based) computing operations, may detect such aging and/or determine and/or adjust a value of the evaluation parameter, such as the value of a threshold, to at least partially compensate for the aging. In other words, the second computing device may detect the aging and adjust one/or more evaluation parameters, such as one or more deterministic parameters, of the first computing device and/or an algorithm performed on the first computing device. In this way, degradation of the field device due to aging can be detected and compensated for in an automated manner.

According to an embodiment of the invention, the field device is configured as a radar-based level measurement device for detecting a fill level of a medium, wherein the measurement signal is an echo curve detected by the sensor arrangement. The echo curve may denote an intensity or strength of the measurement signal as a function of a frequency, a transit time, and/or a distance to the field device.

According to an embodiment of the invention, the second computing device is configured to determine, based on the at least one probability-based and/or classification-based computing operation, a level echo and/or at least one interference echo of the acquired echo curve. The second computing device can assign each echo of the echo curve, for example, to a class of disturbed echoes (or interference echoes) or to a class of the level echo (or interference-free echoes). The second calculator can preselect the echoes of the echo curve and/or determine which of the echoes of the echo curve is the level echo. The level echo can be the echo caused by reflection of the transmitted signal on the surface of the medium. In other words, the second calculator can make a decision on the level echo and/or on one or more false echoes.

According to an embodiment of the invention, the first computing device is configured to determine the level of the medium based on the at least one deterministic computing operation and based on the level echo determined by the second computing device. The fill level can denote the measured value. The first computing device can, for example, measure the level echo determined by the second computing device to determine the level, carry out a scaling, carry out a unit conversion, carry out a rounding and/or carry out an evaluation, for example based on an evaluation algorithm and/or based on one or more evaluation parameters. In this way, efficient operation of the field device can be ensured. Also, the preselection of the second computing device and the actual determination of the measurement value by the first computing device can increase the overall precision, speed, efficiency and/or performance of the field device.

According to an embodiment of the invention, the field device further comprises a first housing in which the first computing device is configured and a second housing in which the second computing device is configured. Further, the field device comprises a communication link for communication and/or data exchange between the first computing device and the second computing device. The first and second housings may denote separate, distinct, and/or separate housings. The communication link may further denote an external and/or housing-external communication link, such as an external bus interface and/or an external bus system.

According to an embodiment of the invention, the first computing device and the second computing device are configured in a common housing. Alternatively or additionally, the first computing device and the second computing device have at least one common memory area in a data memory of the field device. The first computing device and the second computing device may further be coupled via a communication link, an internal or housing-internal communication link, an internal bus interface, and/or an internal bus system. This may allow for a compact design of the field device.

According to an embodiment of the invention, the first computing device is configured to receive a software update and to update the second computing device. Also, for example, a pre-trained neural network and/or parameter values, such as weights of individual nodes of the neural network, and/or a superposition function of the neural network, can be loaded onto the second computing device during a boot process of the field device. Alternatively or additionally, the pre-trained neural network, in particular associated memory areas, can be continuously monitored. This may enable monitoring of safety-related applications. For example, the neural network can be tested for goodness at a regulatory authority, and nothing should change in the neural network during operation of the field device. Soft errors, overwriting of a memory by other software or program parts and the like can be avoided.

It can also be provided that several field devices are provided with second computing devices and send data, such as measurement signals, analog-digital values, measured values and/or results of any computing operations, to a central computer. The central computer may be trained and/or learned based on this data. For example, a neural network may be trained. The learned knowledge, weights, parameters and/or a transfer function of the neural network trained on the central computer can then be transmitted to one or more field devices and/or implemented in the respective second computing device of the field devices.

Another aspect of the invention relates to a method for operating a field device as explained above and below. The method may, as it were, denote a method for determining a measurement value of the process measurement variable. The method thereby comprises the following steps:

Acquiring, with a sensor arrangement of the field device, a measurement signal correlating with the process measurement variable;

assigning at least one deterministic computing operation to a first computing device of an arithmetic arrangement of the field device and/or assigning at least one probability-based and/or classification-based computing operation to a second computing device of the arithmetic arrangement comprising at least one AI module; and Determining, with the computing arrangement of the field device, a measurement value of the process measurement variable based on the measurement signal, in particular based on an execution of the at least one deterministic computing operation and/or the at least one probability-based (and/or classification-based) computing operation.

Features, elements and/or functions described above and below with reference to the field device may be features, elements, functions and/or steps of the method as described above and below, and vice versa.

Examples of embodiments of the invention are described below with reference to the accompanying figures.

Similar, similar-acting, identical or identical-acting elements in the figures may be given similar or identical reference signs. The figures are merely schematic and not to scale.

DETAILED DESCRIPTION OF EXEMPLARY EMBODIMENTS

Figure 1:
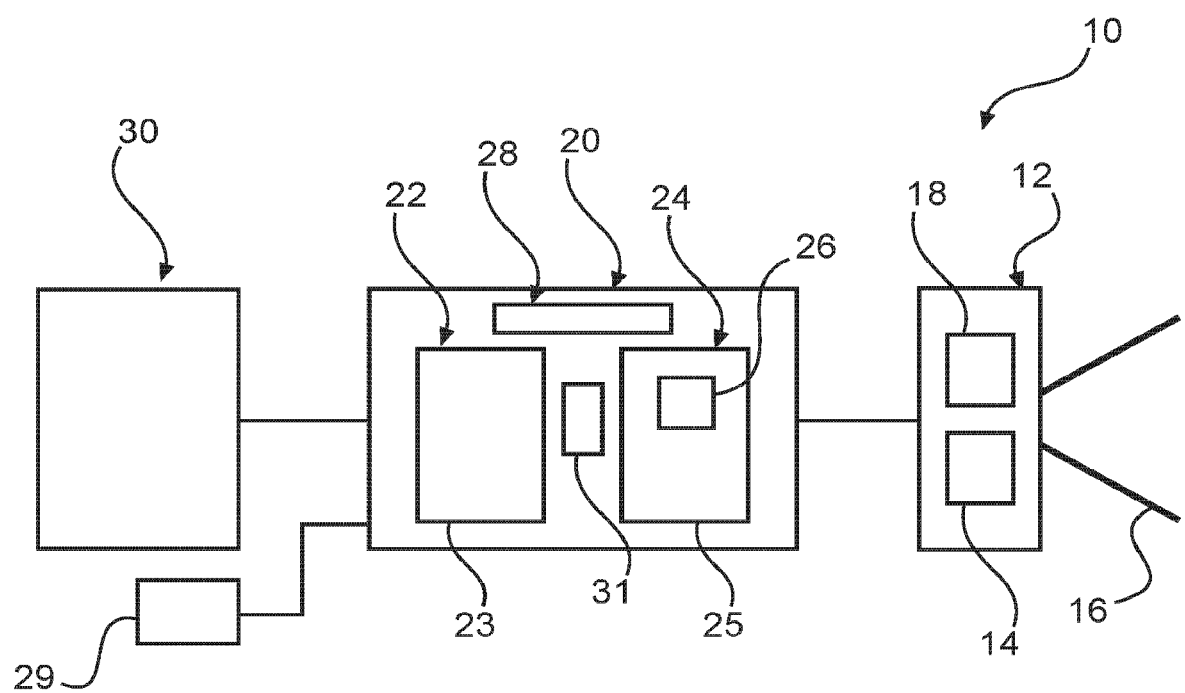
FIG. 1 schematically shows a block diagram of a field device according to an embodiment.

FIG. 1 shows a schematic block diagram of a field device 10 according to an example. The field device 10 of FIG. 1 is exemplarily configured as a level measuring device 10. Alternatively, the field device 10 can be a pressure measuring device, a temperature measuring device, a flow velocity measuring device, a flow meter or any other field device 10.

The field device 10 includes a sensor arrangement 12. The sensor arrangement 12 may comprise, for example, a sensor 14 with a radar module for generating a radar transmission signal, which may be radiated via an antenna 16. The portion of the transmitted signal reflected from the medium and/or another object may be received as a received signal via the antenna 16 and further processed in the sensor 14, for example amplified with an amplifier and/or converted into an intermediate frequency signal with a frequency mixer. The intermediate frequency signal can, for example, be converted into a digital measurement signal by an analog-to-digital converter 18 of the sensor arrangement 12.

The field device 10 further comprises a computing arrangement 20. The computing arrangement 20 can thereby control parts of the sensor arrangement 12, in particular the analog-to-digital converter 18. In particular, the computing arrangement 20 is configured to process the measurement signal and/or to determine a measurement value of a process measurement variable, such as the level of the medium.

The computing device 20 includes a first computing device 22. In particular, the first computing device 22 may comprise a microcontroller, an x86 architecture, a Von Neumann architecture, a Harvard architecture, and/or a hybrid of Von Neumann architecture and Harvard architecture.

The computing arrangement 20 further comprises a second computing device 24 comprising an AI module 26. In particular, the AI module 26 may be an artificial neural network 26. The second computing device 24 may include, for example, a neuromorphic processor, a neurosynaptic processor, and/or a neuristor-based processor. The second computational unit 24 may be implemented in, for example, a graphics processor or the like.

The first and second computing devices 22, 24 can be separate, separate and/or separately implemented and/or configured in separate housings 23, 25. Alternatively, the two arithmetic units 22, 24 can also be implemented in a common housing. Furthermore, the first and second computing devices 22, 24 may have common memory areas or separate memory areas in a data memory 31 of the field device.

In this context, the first computing device 22 is configured to perform one or more deterministic computing operations. Such computing operations may, for example, be related to an analog-to-digital conversion, a scaling for determining the measurement value based on the measurement signal, a unit conversion for determining the measurement value based on the measurement signal, a monitoring of an operability of the field device 10, and/or a calculation of the measured value.

The second computing operation 24 is configured to perform one or more non-deterministic, probability-based and/or classification-based computing operations. Such computing operations may be related to, for example, detecting an aging of at least a portion of the field device 10, detecting a drift of the sensor arrangement 12, detecting a contamination of at least a portion of the sensor arrangement 12, such as the antenna 16, detecting a signal quality of the measurement signal, detecting a signal strength of the measurement signal, detecting at least one perturbing influence on the measurement signal, and detecting an electromagnetic disturbance of at least a portion of the field device 10.

For example, the measurement signal may be in the form of an echo curve with one or more spurious echoes and a level echo. The second computing device 24 may perform a preselection of at least a portion of the echoes and/or a classification of at least a portion of the echoes of the echo curve. In doing so, the second computing device 24 may identify the level echo and send a corresponding information or signal to the first computing device 22. The first computing device 22 can then perform an exact determination of the measured value, such as a determination of the fill level of the medium. This can be, for example, an evaluation of the level echo, a scaling, a unit conversion, a rounding and/or an execution of an evaluation algorithm using one or more evaluation parameters.

Also, the second computing device 24 may determine, for example, a contamination or degree of contamination of the sensor arrangement 12. Alternatively or additionally, the second computing device 24 may determine an aging of components of the field device 10, such as the sensor arrangement 12. If necessary, the second computing device 24 may adjust one or more evaluation parameters used by the first computing device 22 to evaluate the measurement signal and/or the level echo.

Optionally, the computing arrangement 20 further comprises a selector 28 that assigns a computing operation currently to be performed to the first computing device 22 or to the second computing device 24. For this purpose, the selector 28 may determine an energy consumption for performing the computing operation on the first and/or second computing device 22, 24 and assign the computing operation to the arithmetic unit 22, 24 that requires less energy for performing the computing operation. This can be done, for example, based on a table (e.g., a look-up table) with energy consumption values and/or corresponding markers. These may be determined in advance experimentally and/or by simulation. The table may be stored in the data memory 31, for example.

Furthermore, the field device 10 has an energy storage 29, which can at least temporarily and/or temporarily supply at least parts of the computing arrangement 20, such as the selector 28, the first computing device 22 and/or the second computing device 24, with electrical energy and thus cover energy demand peaks. This may be particularly advantageous in an embodiment of the field device 10 as a two-wire field device 10. The energy storage device 29 may be implemented, for example, in the form of a capacitor, a battery and/or an accumulator.

Furthermore, the field device has a display unit 30 on which, for example, the measurement value or any other information can be displayed.

Figure 2:
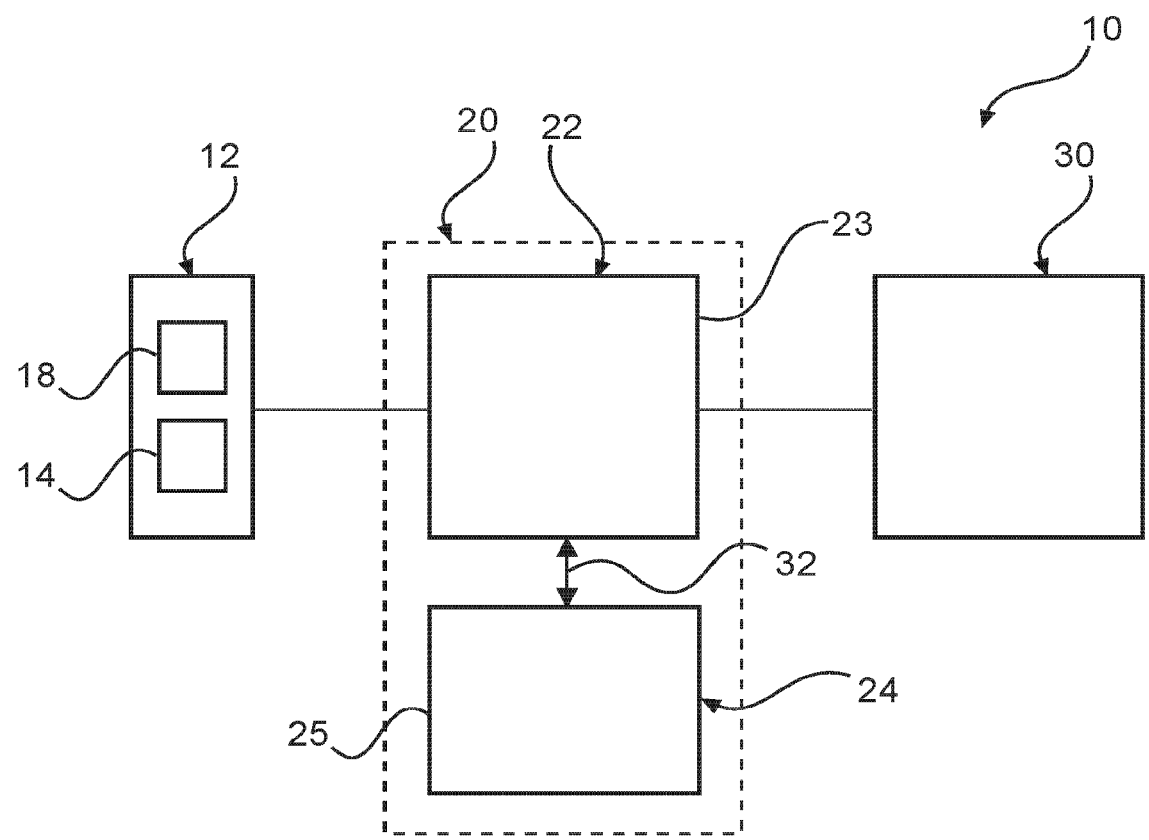
FIG. 2 schematically shows a block diagram of a field device according to an embodiment.

FIG. 2 schematically shows a block diagram of a field device 10 according to an embodiment. Unless otherwise described, the field device 10 of FIG. 2 has the same elements and features as the field device 10 of FIG. 1.

In the embodiment shown in FIG. 2, the first computing device is configured in a first housing 23 and the second computing device 24 is configured in a second, separate housing 25. The two arithmetic units 22, 24 are coupled to each other via a communication link 32 and can thus exchange data and/or signals.

Figure 3:
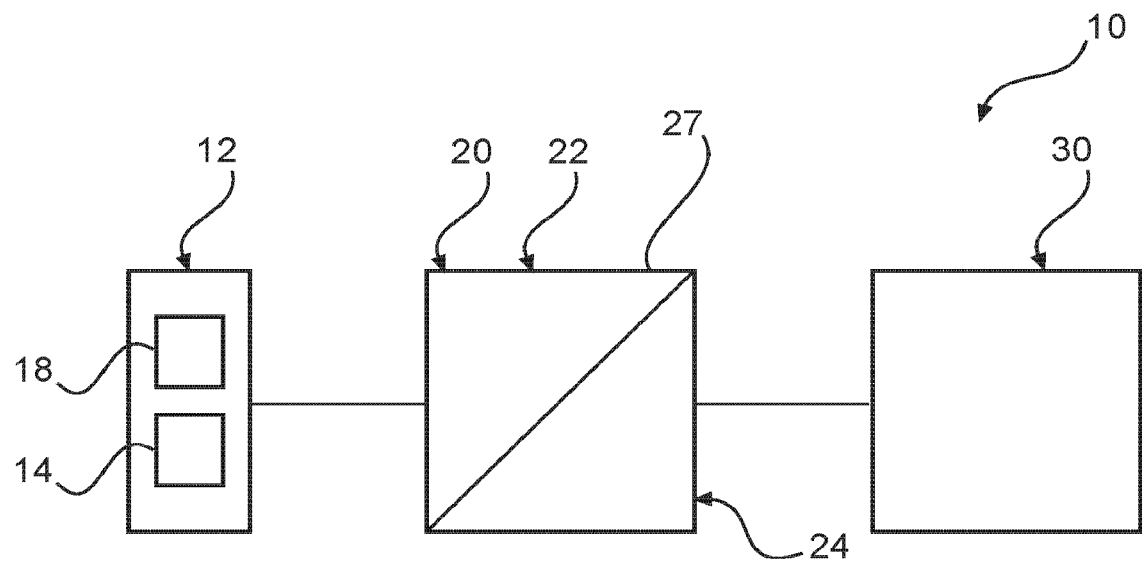
FIG. 3 schematically shows a block diagram of a field device according to an embodiment.

FIG. 3 schematically shows a block diagram of a field device 10 according to an embodiment. Unless otherwise described, the field device 10 of FIG. 3 has the same elements and features as the field devices 10 of FIGS. 1 and 2.

In the embodiment shown in FIG. 3, the first and second computing devices 22, 24 are configured in a common housing 27. The first and second computing devices 22, 24 can exchange data and/or signals via an internal communication link.

Figure 4:
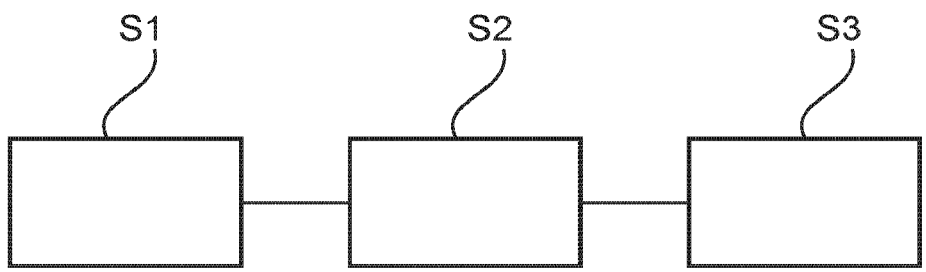
FIG. 4 shows a flowchart illustrating steps of a method for operating a field device according to an embodiment.

FIG. 4 shows a flowchart illustrating steps of a method for operating a field device according to an embodiment. The field device 10 of FIG. 4 may be one of the field devices 10 described with reference to FIGS. 1 to 3.

In a first step S1, the sensor arrangement 12 of the field device 10 acquires a measurement signal correlating with the process measurement variable. In a further step S2, at least one deterministic computing operation is assigned to the first computing device 22 of the arithmetic arrangement 20 of the field device 10 and/or at least one probability-based and/or classification-based computing operation is assigned to the second computing device 24 of the arithmetic arrangement 20, for example by means of the selector 28. In a further step S3, the arithmetic arrangement 20 of the field device 10 is used to determine the measurement value of the process measurement variable based on the measurement signal, in particular by performing the at least one deterministic computing operation and/or the at least one probability-based and/or classification-based computing operation.

Supplementally, it should be noted that "comprising" and "comprising" do not exclude other elements or steps, and the indefinite articles "one" or "a" do not exclude a plurality. It should further be noted that features or steps that have been described with reference to any of the above embodiments may also be used in combination with other features or steps of other embodiments described above. Reference signs in the claims are not to be regarded as limitations.

The invention claimed is:

1. A field device for detecting a process measurement variable, which is configured as a level measuring device for detecting a fill level of a medium, the field device comprising:
   a sensor arrangement configured to detect a measurement signal correlating with the process measurement variable;
   a computing arrangement configured to determine a measurement value of the process measurement variable based on the measurement signal,
      wherein the computing arrangement comprises at least one first computing device and at least one second computing device,
      wherein the first computing device is configured to perform at least one deterministic computing operation, and
      wherein the second computing device comprises at least one artificial intelligence module, and is configured to perform at least one probability-based and/or classification-based computing operation; and
   a selector configured to assign a computing operation to be performed by the computing arrangement to the first computing device or the second computing device as the alternative.

2. The field device according to claim 1,
   wherein the selector is further configured to determine an energy consumption for performing the computing operation by the first computing device and/or by the second computing device, and/or
   wherein the selector is further configured to allocate the computing operation to be performed by the computing arrangement to that one of the first computing device and the second computing device for which a power consumption for performing the computing operation is lower.

3. The field device according to claim 1, further comprising at least one energy storage, which is configured to supply the first computing device and/or the second computing device at least temporarily with electrical energy.

4. The field device according to claim 1, wherein the field device is further powered as a two-wire field device.

5. The field device according to claim 1, wherein the field device is further powered as a 4-20 mA field device.

6. The field device according to claim 1, wherein the at least one deterministic computing operation is associated with at least one operation selected from the group consisting of analog-to-digital conversion, scaling to determine the measurement value based on the measurement signal, unit conversion to determine the measurement value based on the measurement signal, monitoring a functionality of the field device, and computing the measurement value.

7. The field device according to claim 1, wherein the at least one probability-based and/or classification-based computing operation comprises at least one operation selected from the group consisting of detecting aging of at least a part of the field device, detecting drift of the sensor arrangement, determining a contamination of at least a part of the sensor arrangement, determining a signal quality of the measurement signal, determining a signal strength of the measurement signal, detecting at least one disturbance influence on the measurement signal, and detecting an electromagnetic disturbance of at least a part of the field device.

8. The field device according to claim 1,
wherein the second computing device is further configured to adjust a value of at least one evaluation parameter, and
wherein the first computing device is further configured to determine the measurement value based on the at least one configured evaluation parameter and based on the at least one deterministic computing operation.

9. The field device according to claim 1,
wherein the first computing device comprises a microcontroller, an x86 architecture, a Von Neumann architecture, a Harvard architecture, and/or a hybrid of Von Neumann architecture and Harvard architecture, and/or
wherein the artificial intelligence module of the second computing device comprises an artificial neural network, a neuromorphic processor, a neurosynaptic processor, and/or a neuristor-based processor.

10. The field device according to claim 1,
wherein the field device is configured as a radar-based level measuring device for detecting the fill level of a medium, and
wherein the measurement signal comprises an echo curve detected with the sensor arrangement.

11. The field device according to claim 10, wherein the second computing device is further configured to determine a level echo and/or at least one false echo of the detected echo curve based on the at least one probability-based and/or classification-based computing operation.

12. The field device according to claim 11, wherein the first computing device is further configured to determine the fill level of the medium based on the at least one deterministic computing operation and based on the level echo determined by the second computing device.

13. The field device according to claim 1, further comprising:
a first housing in which the first computing device is arranged;
a second housing in which the second computing device is arranged; and
a communication link configured for communication and/or data exchange between the first computing device and the second computing device.

14. The field device according to claim 1,
wherein the first computing device and the second computing device are arranged in a common housing, and/or
wherein the first computing device and the second computing device have at least one common memory area in a data memory of the field device.

15. A method of operating a field device comprising the field device according to claim 1, the method comprising:
acquiring, with a sensor arrangement of the field device, a measurement signal correlating with the process measurement variable;
assigning, by a selector of the field device, at least one deterministic computing operation to a first computing device of a computing arrangement of the field device and/or assigning at least one probability-based and/or classification-based computing operation to a second computing device of the computing arrangement, which comprises at least one artificial intelligence module, wherein the selector assigns the computing operation to be performed by the computing arrangement to the first computing device or the second computing device as the alternative; and
determining, with the computing arrangement of the field device, a measurement value of the process measurement variable based on the measurement signal.

* * * * *